Dec. 19, 1922.    1,439,402
T. V. BUCKWALTER,
SHAFT BEARING.
ORIGINAL FILED MAY 27, 1921.
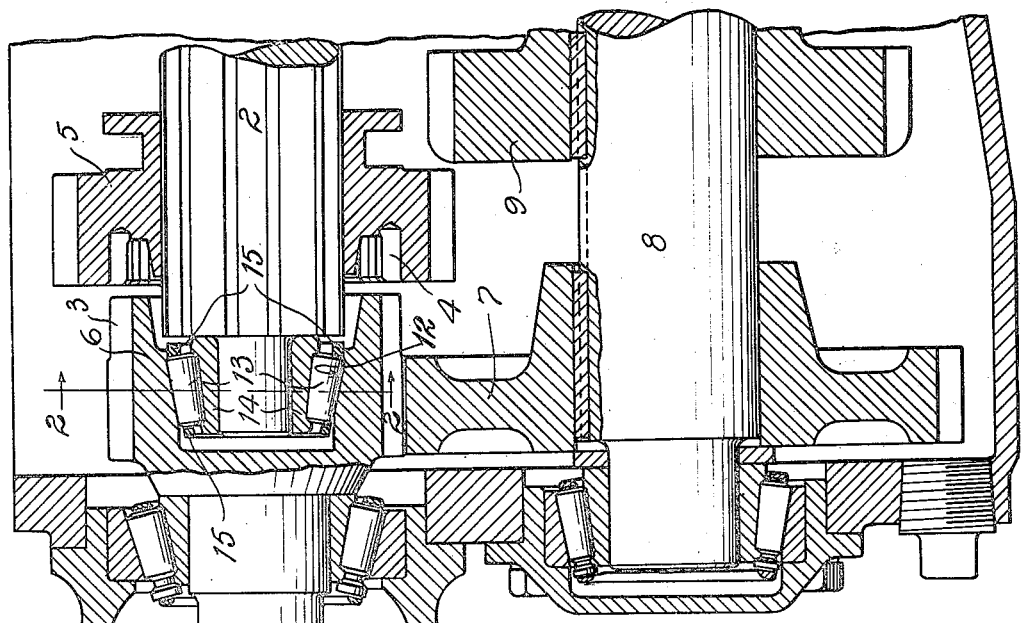
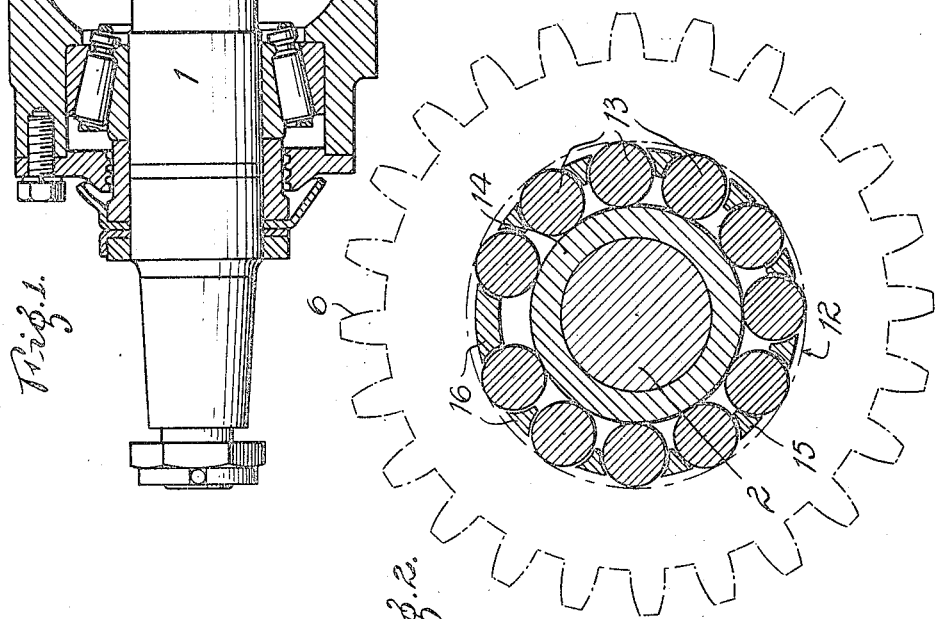
Inventor:
Tracy V. Buckwalter
by Bound Cause
His Attorneys.

Patented Dec. 19, 1922.

1,439,402

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

SHAFT BEARING.

Original application filed May 27, 1921, Serial No. 472,992. Divided and this application filed January 11, 1922. Serial No. 528,481.

*To all whom it may concern:*

Be it known that I, TRACY V. BUCKWALTER, a citizen of the United States, and a resident of the city of Canton, in the county of Stark and State of Ohio, have invented a new and useful Improvement in Shaft Bearings, of which the following is a specification.

This application is a division of my application Ser. No. 472,992, filed May 27, 1921.

Antifriction bearings are frequently interposed between shafts or other parts which are required to rotate at some times in unison and some times relatively to each other. For instance, antifriction bearings are interposed between the two sections of the main transmission shaft of an automobile and which are in alinement with each other and adapted to be actuated at the same or different speeds according to the shifting of the change speed mechanism, the normal or direct drive being at the same speed. In such case, the antifriction bearing functions as such except on direct drive, in which condition there is no occasion for it to function, as the two shafts move in unison. While the mechanism is operating upon direct drive, with a motor carried by the spring loaded body and the transmission shaft operatively connected to the axle shaft sections with the aid of universal joints, there is considerable rubbing and end thrust that tends to bring about relative movement of the antifriction rollers or balls with relation to the bearing cups and cones. This endwise rubbing has a tendency to form flutes or grooves in the bearing cup and cone; and when such flutes or grooves once get started, there is a tendency for the antifriction rollers or balls to come to rest, after rotation, in such flutes or grooves, thus deepening them and greatly impairing or destroying the value of the antifriction bearing.

The principal object of the present invention is to provide such shafts with an antifriction bearing that will overcome or minimize the above tendency to flute the bearing cup; and it consists principally in providing a bearing in which the antifriction rollers or balls are arranged so that one or more of the series will be spaced from its neighbor a different distance from the normal spacing. It also consists in the arrangements and combinations of parts hereinafter described and claimed.

In the accompanying drawing, which forms part of this specification, and wherein like reference numerals indicate like parts wherever they occur.

Fig. 1 is a sectional view of a portion of an automobile transmission mechanism and of a roller bearing embodying my invention; and Fig. 2 is a cross sectional view of the bearing along the line 2—2 of Fig. 1.

For the purpose of illustrating my invention, I have shown a conical roller bearing of a well-known type applied to the front end of transmission gearing of a type commonly used in automobiles. In this construction, the transmission shaft is made in two sections, numbered 1 and 2, of which section 1 receives its power from the motor and has clutch teeth 3 on its end arranged to cooperate with clutch teeth 4 formed in the hub of a pinion 5 that is slidably mounted on the other transmission shaft section 2 which is in alinement with said first shaft section 1 and which is operatively connected by well-known means to the shaft sections of the driving axle (not shown in the drawings). When the sliding pinion 5 on the second transmission shaft section 2 is moved into such position that its clutch teeth 4 engage the clutch teeth 3 on the end of the motor driven shaft section 1, the shaft sections 1 and 2 move as a unit; and this is the normal relation in driving and is commonly referred to as direct drive.

In the construction shown, the end of the shaft section 1 that is driven by the motor has a gear or pinion 6 formed thereon which meshes with a pinion 7 on the counter shaft 8 of the transmission gearing. This counter shaft 8 is also provided with additional pinions (such as the pinion 9 shown in the drawings) that cooperate with pinions secured on the main transmission shaft, and slidable thereon such as the pinion 5, all arranged in a well-known manner so that the motion of the motor driven shaft section 1 will be transmitted through the counter shaft 8 to the second transmission shaft section 2, which in consequence, will rotate at a lower speed than the first shaft 1 or in reverse direction. This change speed mechanism is well understood and accordingly I have shown only part of it in the drawing. In order to reduce friction during indirect drive, an antifriction bearing is interposed between the adjacent ends of the transmission shaft sections; and, for divers reasons, it is desirable to form the cup or outer bearing surface for the bearing in the end of the motor driven shaft section 1. In the construction illustrated in the drawing, the gear 6 on the motor driven shaft section 1 is provided with a recess into which extends the end of the second shaft 2 and in this recess is formed a cup or outer bearing member 12 for an antifriction bearing. In this cup 12 is placed an antifriction bearing comprising conical rollers 13 or other antifriction elements which are mounted in a circular series on a cone or inner bearing member 14 secured to the end of the transmission shaft section 2.

The antifriction rollers 13 or balls are spaced apart and kept in proper position by means of a cage 15. Heretofore it has been customary to space apart rollers of a series as uniformly as practicable and great care has been taken to avoid unevenness of spacing. I attribute the fluting of the bearing cup above mentioned very largely to the even spacing of the rollers or balls; and for this reason I make one or more of the spaces between adjacent rollers or balls different from the normal spacing of the series. For this purpose, one or more of the bridges or longitudinal members 16 that connect the annular end members of the cage is made an appreciable amount wider or narrower (preferably wider) than the other bridges. As a result of this difference in spacing, one or another of the rollers will be out of register with the incipient grooves started by any other rollers and thus, the uneven spacing overcomes or minimizes the tendency, incidental to the even spacing, to deepen the incipient flute.

It is noted that the mere omission of one roller from an evenly spaced series would not accomplish the purpose of the present invention, because the remaining rollers of the series that is thus rendered incomplete are evenly spaced and would all register simultaneously in the incipient grooves. For the purpose of the present invention, the series of rollers must contain one whose angular distance from its neighbor measured with reference to their respective centers and the center of the circular series is different from the normal angular spacing of the rollers of the series and is not a multiple thereof.

While I have described my invention as applied to a common form of transmission gearing for automobiles, it is obviously applicable to other relations wherein a bearing is interposed between parts that some times move in unison and at other times rotate relatively to each other. Likewise, while I have illustrated a conical roller bearing, the invention is applicable to rollers of other forms and to balls.

What I claim is:

1. In combination with two shafts mounted in endwise alinement and provided with means whereby they may be rotated in unison or relatively to each other, an antifriction bearing interposed between the ends thereof, said bearing having the majority of its rollers a uniform distance apart, but one or more thereof spaced a distance apart from an adjoining roller that is different from such uniform distance and not a multiple thereof.

2. In combination, two shafts mounted in endwise alinement and provided with means whereby they may be rotated in unison or relatively to each other, one of said shafts being provided with an enlarged hollow end portion into which the other shaft projects, an antifriction bearing interposed between the ends of said shafts, said bearing having the majority of its rollers a uniform distance apart, but one or more thereof spaced a distance apart from an adjoining roller that is different from such uniform distance and not a multiple thereof.

3. In an automobile axle, a propeller shaft, a stem gear on the end thereof having a central opening, a main transmission shaft in endwise alinement with said propeller shaft, the end portion thereof extending into the opening in said stem gear, a pinion slidable on said main transmission shaft and provided with clutch teeth adapted to mesh with the teeth of said stem gear, whereby said shafts may be rotated in unison or relatively to each other, and a roller bearing interposed between said shaft and said stem gear, said bearing having the majority of its rollers spaced a uniform distance apart, but one or more thereof spaced a different distance from an adjoining roller.

4. In an automobile axle, a propeller shaft, a stem gear on the end thereof having a tapered central opening, a main transmission shaft in endwise alinement with said propeller shaft, the end portion thereof extending into the opening in said stem gear, a pinion slidable on said main transmission shaft and provided with clutch teeth adapted to mesh with the teeth of said stem gear, whereby said shafts may be rotated in unison or relatively to each other, and a conical roller bearing interposed between said shaft and said stem gear, said bearing having the majority of its rollers spaced a uniform distance apart, but one or more thereof spaced a different distance from an adjoining roller.

Signed at Canton, Ohio, this 6th day of January, 1922.

TRACY V. BUCKWALTER.